J. L. CAYER.
AUTOMOBILE SIGNALING APPARATUS.
APPLICATION FILED JUNE 1, 1915.
1,191,278.
Patented July 18, 1916.
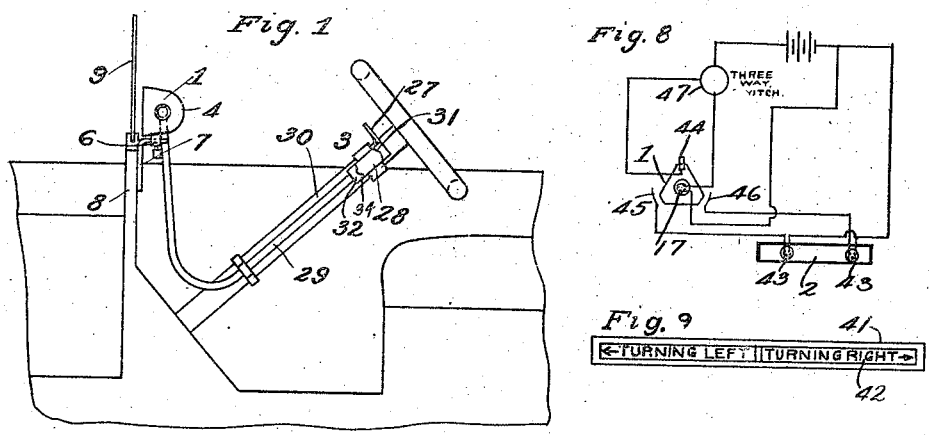
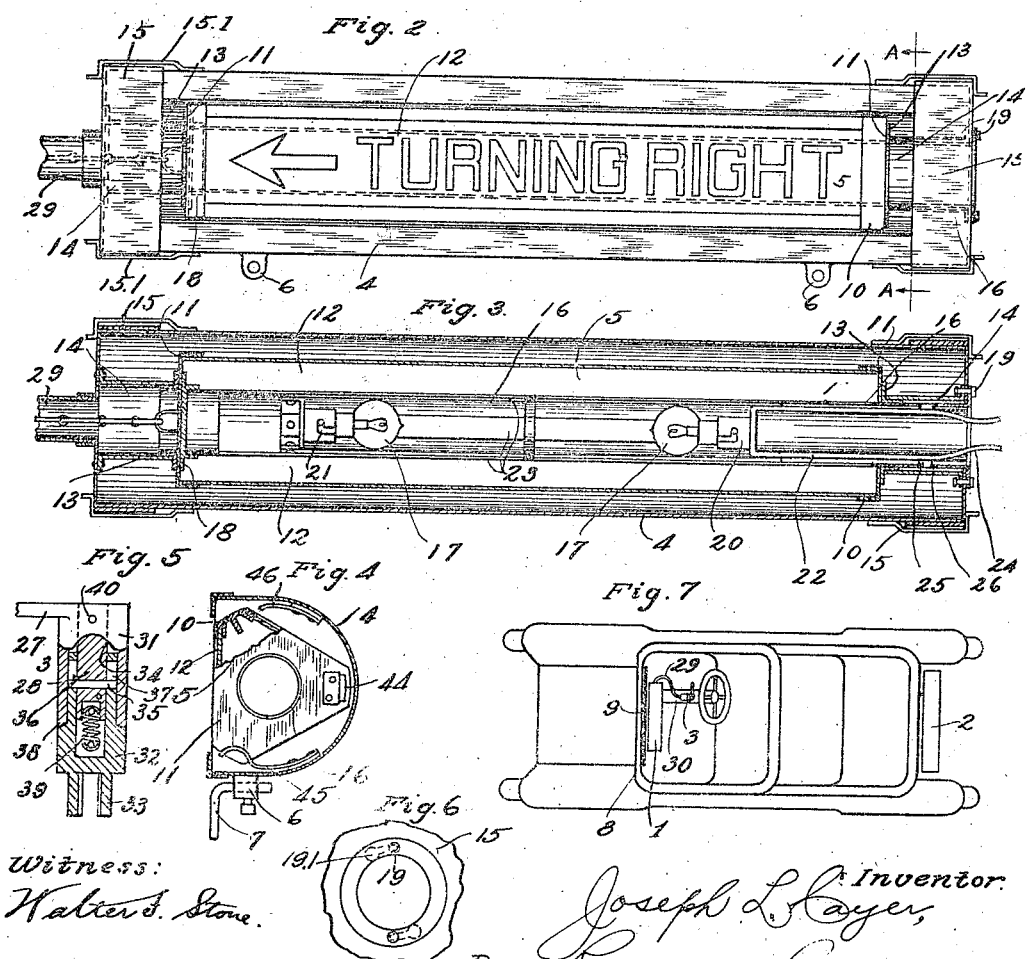
Witness:
Walter J. Stone.
Inventor:
Joseph L. Cayer,
By Rummler & Rummler
Attys.

UNITED STATES PATENT OFFICE.

JOSEPH L. CAYER, OF CHICAGO, ILLINOIS, ASSIGNOR TO CAYER SIGNAL COMPANY, OF CHICAGO, ILLINOIS, A CORPORATION OF ILLINOIS.

AUTOMOBILE SIGNALING APPARATUS.

1,191,278.

Specification of Letters Patent. Patented July 18, 1916.

Application filed June 1, 1915. Serial No. 31,467.

*To all whom it may concern:*

Be it known that I, JOSEPH L. CAYER, a citizen of the United States of America, and a resident of Chicago, county of Cook, and State of Illinois, have invented certain new and useful Improvements in Automobile Signaling Apparatus, of which the following is a specification.

The main objects of this invention are to provide an improved form of signaling apparatus of the type shown and described in Patent No. 1,081,433, issued to me December 16, 1913; to provide an improved construction and arrangement of the indicator and mechanism for operating the same; and to provide improved means for mounting the lights within the indicator.

An illustrative embodiment of this invention is shown in the accompanying drawings, in which:

Figure 1 is a diagrammatic view of the steering mechanism for an automobile and the adjacent parts with the improved signaling device mounted in position thereon. Fig. 2 is an enlarged front view of one of the signaling devices. Fig. 3 is a longitudinal sectional elevation of the same. Fig. 4 is a transverse sectional view taken on the line A—A of Fig. 1. Fig. 5 is an enlarged detail partly sectional of the operating lever by means of which the indicators are shifted and locked in one or the other of their positions. Fig. 6 is a fragmentary end view of the device showing how the reflector is detachably connected to the casing. Fig. 7 is a diagrammatic plan of an automobile illustrating the arrangement of the signaling devices thereon. Fig. 8 is a diagrammatic view showing the arrangement of the wiring. Fig. 9 is an elevation of the rear signaling device.

In the construction herein shown, the apparatus comprises a front signaling device or indicator 1, a rear signaling device 2, and a controlling device 3.

The front signaling device 1 comprises a housing or casing 4 of substantially cylindrical shape, having one side thereof open through which the signs on the indicator 5 are displayed. Brackets 6 are attached to the housing and arranged to engage supports 7 whereby the device may be conveniently located so as to expose the signs to the view of pedestrians and others in front of the vehicle. As herein shown, the supports 7 are mounted on the dash 8 of an automobile so that the indicator is located back of the windshield 9.

The indicator 5 is of hollow triangular prismatic construction comprising a metal skeleton 10, on which are supported three transparent sign panels 12. The indicator is rotatably supported in the housing 4, by means of collars or ferrules 13 secured to the end plates 11 of the indicator and journaled in bearings or tubes 14 secured to the end plates or caps 15 of the housing. The end plates 11 fit over the ends of the indicator and without the use of screws or other similar fastening means are firmly held in place by the abutting of the bearings 14 against them. The end caps 15 are also telescopingly supported on the casing 4 and are held in position by the spring clips 15.1.

The reflector 16 is a hollow tube cut away between its ends so as to provide a semi-cylindrical reflecting surface from which the light from the lamps 17 is reflected. At the inner end the reflector is supported on a collar or ferrule 18 secured to the inner face of the end plate 11, and at the outer end it is supported in the collar 13 on the housing 4. The outer, or right-hand end, with respect to Figs. 2 and 3, is therefore open, and through this opening the lamps 17 are inserted and withdrawn. The reflector is locked in position in the indicator by headed pins 19 which coact with the slots 19.1 formed in the casing 4 as shown in Fig. 6. The lamps 17 are preferably electric light bulbs attached to holders or sockets 20 and 21, the holder 20 being secured to a pair of resilient arms 22, and the holder 21 being attached to said arms by means of bars 23. The resilient arms 22 are curved at their outer ends so as to provide finger grips 24, to be gripped when removing or replacing the lamps. Shoulders or pins 25 are formed on the arms 22 inwardly of the ends which are adapted to engage notches or recesses 26, cut in the reflector 16, for the purpose of securing the lamps in position in the indicator. This arrangement permits the lamps 17 to be readily withdrawn from the device for the purpose of inspection, cleaning or renewal, and to be again readily replaced without dismantling or disconnecting any parts of the device.

Signs or characters are placed upon the panels 12 so as to be plainly read from the front, and indicate in advance the direction of travel of the vehicle. These characters may consist of words "Straight ahead", "Turning right" and "Turning left", or other words of similar import. In connection with the words "Right" and "Left", it is also desirable to add an arrow pointing in the respective directions, as shown in Fig. 2. The transparency of the panels 12 and the illumination back of them make it possible for the signs to be easily read at night, as well as in the day time.

The rear signaling device comprises a box or casing 41 having a glass front 42. The casing is divided in two parts and provided with a lamp 43 in each compartment. The glass 42 has signs placed thereon, one for each part reading respectively "Turning right" and "Turning left", similar to the signs on the front device. The lighting of the lamps 43 is controlled by the coaction of a contact 44 and brushes 45 and 46. The contact 44 is mounted on the indicator 5 so as to engage one or the other of the brushes 45 or 46 when said indicator 5 is set to expose one or the other of the turning signs, and thereby close the circuit to one or the other of the lamps 43. The circuits are diagrammatically shown in Fig. 8. A three-way switch 47 is interposed in the circuit so as to cut out all of the lamps or cut in all of the lamps, or cut out the lamps 17 and leave the circuits to the lamps 43 in condition for operation by the contact 44 and brushes 45 and 46.

The controlling mechanism 3 for rotating the indicator 5 comprises a lever 27 journaled in a bearing 28 and connected by flexible shaft 29 to the indicator. The bearing 28 is secured on the vehicle adjacent to the driver's or operator's seat, so as to be conveniently reached at all times. In automobiles, this may be located on the tube 30 inclosing the steering wheel shaft. The flexible shaft casing is connected to the end cap 15 and the shaft itself is connected to the end plate 11.

Coacting with the lever 27 and bearing 28 are a pair of parts 31 and 32, the one being an integral part of the lever 27, and the other having a fork 33 to which the flexible shaft 29 is connected. The parts 31 and 32 and the opposed faces of the bearing 28 are formed with cam shoulders 34, there being three in number on each of the opposed faces of said parts and bearing. These cam shoulders are spaced equally angularly and so shaped that the lever 27 is normally urged into and held in one or the other of the three positions, which determine the three positions of the indicator. The parts 31 and 32 are connected together so as to rotate in synchronism, but so that they may shift axially to allow the passing of the high points of the cam shoulders as the lever 27 is shifted. This is accomplished by means of a pin 35 carried in a stud 36 and having the ends located in slots 37 formed in the upper end of a tubular shank 38. A spring 39 connects the part 32 with the stud 36, so that the parts 31 and 32 are yieldingly urged toward each other. The stud 36 is rigidly secured to the part 31 by means of a pin 40, and the tubular shank 38 is integral with the part 32.

The operation of the device shown is as follows: As long as the driver or operator intends to continue the course of the vehicle straight ahead, the lever 27 is set in its middle position, whereby the indicator 5 reads "Straight ahead". This indicates the proposed course of the vehicle to persons in front. When approaching a corner at which a turn is to be made, the operator shifts the lever 27 one way or the other, whereupon the indicator 5 is rotated so as to display the proper sign. When the indicator is changed to one of these positions the corresponding brush 45 or 46 and the contact 44 complete the circuit to one of the lamps 43 and illuminate the sign of the rear signaling device corresponding to the one shown in the front, whereupon, persons at the rear of the vehicle are also given warning as to the alteration of the course thereof.

One of the advantages of the construction of the front signaling device shown in the figures is the fact that the entire device can be dismantled or assembled without the use of any tools. If for instance one of the glass panels should require replacing, the device would be readily dismantled in the following manner: After removing the lamps 17 the reflector is turned to bring the pins 19 into position to be removed from the slots 19.1, whereby the reflector is withdrawn. By retracting the spring clips 15.1 the end plate 11 may be removed, thereby allowing the indicator to be withdrawn. It then only requires the removal of the end plate 11 to withdraw a panel and insert a new one. The assembling of the parts is reversed.

Although but one specific embodiment of this invention has been herein shown and described, it will be understood that numerous details of the construction shown may be altered or omitted without departing from the spirit of this invention as defined by the following claims.

I claim:

1. In a device of the class described, the combination of a support, a hollow transparent indicator rotatably mounted thereon and having one end thereof open, mechanism for rotating said indicator, a lamp-holder mounted in said indicator and removable through said open end, a lamp carried by said holder, and resilient means adapted to secure said holder in position in said indicator.

2. In a device of the class described, the combination of a support, a hollow transparent indicator rotatably mounted thereon and having one end thereof open, mechanism for rotating said indicator, a lamp-holder mounted in said indicator and removable through said open end, a lamp carried by said holder, and a pair of resilient arms connected to said holder and arranged to engage the wall of said indicator for securing said lamp in position.

3. In a device of the class described, the combination of a support, a hollow transparent indicator rotatably mounted thereon and having one end thereof open, mechanism for rotating said indicator, a lamp-holder mounted in said indicator and removable through said open end, a lamp carried by said holder, a pair of resilient arms connected to said holder, and coacting shoulders on said indicator and arms adapted to have interlocking engagement for securing said lamp and holder in position.

4. In a device of the class described, the combination of a support, a hollow transparent indicator rotatably mounted thereon and having one end thereof open, mechanism for rotating said indicator, a lamp-holder mounted in said indicator and removable through said open end, a lamp carried by said holder, a pair of resilient arms connected to said holder, said indicator having notches in the wall thereof, and shoulders on said arms adapted to engage said notches for securing said lamp and holder in position.

5. In a device of the class described, the combination of a housing open along one side, a hollow prismatic indicator rotatably mounted within said casing, and open at one end, mechanism for rotating said indicator so as to register one or another of the faces thereof with said open side, a semi-cylindrical open-ended reflector mounted within said indicator in axial alinement therewith and secured against rotation, and a lamp mounted within said reflector and removable through said open ends of said reflector and indicator.

6. In a device of the class described, the combination of a housing open along one side, a hollow prismatic indicator rotatably mounted within said casing, and open at one end, mechanism including a flexible shaft connected axially to the other end for rotating said indicator so as to register one or another of the faces thereof with said open side, a semi-cylindrical open-ended reflector mounted within said indicator in axial alinement therewith and secured against rotation, and a lamp mounted within said reflector and removable through said open ends of said reflector and indicator.

7. In a device of the class described, the combination of a support, an indicator rotatably mounted thereon, an operating lever, a bearing for said lever, a flexible shaft connecting said lever with said indicator, and co-acting cam shoulders on said lever and bearing shaped and engaging each other so as to cause said lever to occupy one of a plurality of certain angular positions with respect to said bearing whereby said indicator is normally locked in one of its positions.

8. In a device of the class described, the combination of a support, an indicator rotatably mounted thereon, an operating lever, a bearing for said lever, a pair of parts located on opposite sides of said bearing and having cam shoulders formed on the opposed faces of said parts and bearing, a spring connecting said parts so as to normally urge said parts to occupy one of a plurality of certain angular positions with respect to said bearing, one of said parts being rigidly connected to said lever, and a flexible shaft connecting the other said part to said indicator.

9. The combination with an automobile having a steering wheel the shaft of which is inclosed in a casing, of a support on said automobile, an indicator rotatably mounted on said support, an operating lever, a bearing for said lever mounted on said casing below the steering wheel, a flexible shaft connecting said lever with said indicator, and coacting cam shoulders on said lever and bearing shaped and engaging each other so as to cause said lever to occupy one of a plurality of certain angular positions with respect to said bearing whereby said indicator is normally locked in one of its positions.

10. In a device of the class described, the combination of a casing, end caps closing the ends of said casing, spring clips engaging said end caps for retaining them in position on said casing, a hollow transparent indicator, tubular members secured respectively to said end caps and the ends of said indicator and having telescoping engagement for rotatably supporting said indicator in said casing, mechanism for rotating said indicator, and a lamp mounted in said indicator for illuminating the same.

Signed at Chicago this 28th day of May, 1915.

JOSEPH L. CAYER.